July 7, 1925.

J. F. PANYARD

PISTON PACKING

Original Filed April 5, 1923    2 Sheets-Sheet 1

1,545,274

INVENTOR.
John F. Panyard
BY Ralzemond A. Parker
ATTORNEY.

INVENTOR.
John F. Panyard
BY
Ralzemond A. Parker
ATTORNEY.

Patented July 7, 1925.

1,545,274

UNITED STATES PATENT OFFICE.

JOHN F. PANYARD, OF DETROIT, MICHIGAN.

PISTON PACKING.

Application filed April 5, 1923, Serial No. 629,992. Renewed May 12, 1924.

*To all whom it may concern:*

Be it known that I, JOHN F. PANYARD, a citizen of the United States, residing at Detroit, county of Wayne, State of Michigan, have invented a certain new and useful Improvement in Piston Packings, and declare the following to be a full, clear, and exact description of the same, such as will enable others skilled in the art to which it appertains to make and use the same, reference being had to the accompanying drawings, which form a part of this specification.

My improvement relates to piston packing and to that class of piston packing in which the construction and arrangement of the packing in the piston groove is such that rotation of one ring section in a given direction produces side thrust of the packing in the groove to seal the joint formed with the side walls of the groove.

In piston packing of this character one or more ring sections are disposed within the groove and held under rotatable pressure. These sections have oppositely-disposed longitudinally-tapered lateral meeting faces so that when one section is rotated counter the taper of the other the packing is wedged axially against the side walls of the groove to form a perfect seal therewith and prevent the leakage of oil underneath the packing and through the groove. Absolute accuracy of construction and perfection of fit between the separate sections of the packing, the side walls of the groove and the wall of the cylinder is impossible because of the quantity production followed at the present time. Inaccuracy is further increased by wear due to use. Packing, however, to be commercially practical, must be durable and economical as well as efficient.

My improvement consists in forming the meeting circumferentially tapered faces of the ring section on a radius. In a preferred construction, one ring section is substantially larger than the other, is provided with a base that substantially fills the bottom of the groove, and the longitudinally tapered face is concave while the tapered meeting face of the co-acting small section is convex. These faces are cut on the same radius. Slight irregularities or inaccuracies do not materially affect the seating of this packing and it adjusts itself readily to the seat in the groove, the separate sections seating easily and freely with each other. The convexity of the small section increases its strength over that possessed by a similar section having a beveled tapered face. The compression of the cylinder wall, though slight due to the packing construction being such that the seal with the side walls of the groove is obtained by the rotation of one ring section relative the other rather by the compression exerted by the cylinder wall on the packing, nevertheless assists in seating the ring sections in the groove and against each other.

In the drawings,—

Figure 1:
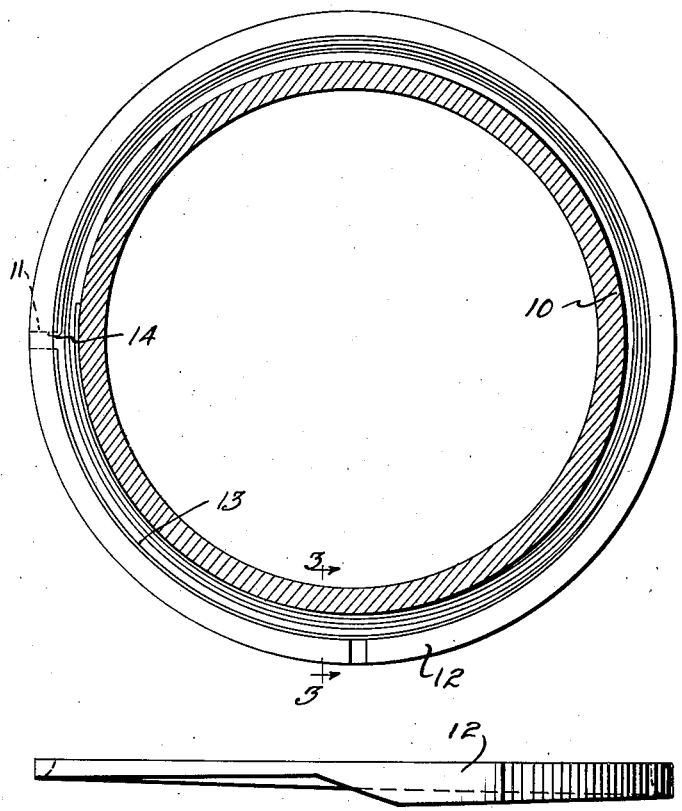
Figure 1 is a horizontal sectional view through a piston showing a specific embodiment of my improved packing.
Figure 3:
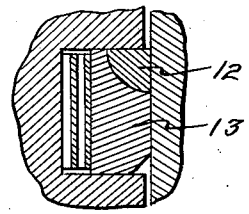
Fig. 3 is a fragmentary sectional view taken on the line 3—3 of Fig. 1.

The several specific embodiments illustrative of my invention appearing in the drawings each comprise a packing consisting of a pair of co-operating ring sections one or both of which are held under yielding pressure to produce relative rotation to accomplish axial expansion of the packing within the groove to wedge the packing against the respective side walls of the groove and make a tight fitting joint at such points.

Figure 2:
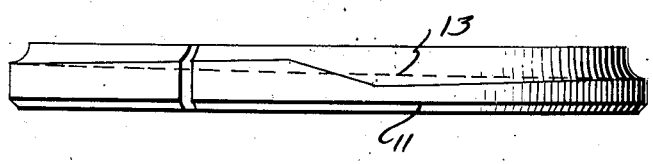
Fig. 2 is a side elevation of the two ring sections comprising my packing separated from each other.
Figure 4:
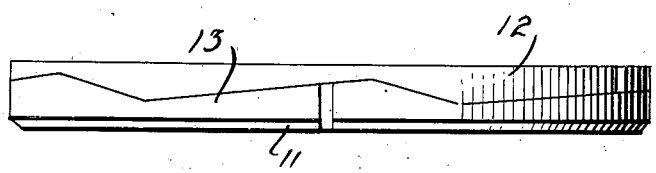
Fig. 4 is a side elevation of a modified form of my improved packing.

In Figs. 1 and 2 I have shown in association with the piston 10 packing rings 11 and 12. Though a greater plurality of ring sections might be employed, a single pair has been found particularly suitable for the purpose. The large ring section 11 substantially fills the bottom of the groove and is cut away on the outer face to provide a helical surface 13 formed on a radius, as appears in Fig 2. This concave face 13 engages a convex face of the small ring section 12. As shown in Fig 2, a single helical face is used. However, a plurality of inclined faces might be employed, as appears in Fig. 4.

The ring sections quickly and with substantial accuracy find a seat with each other due to the character of their meeting faces, and the use of a convex meeting face on the small ring section increases its strength by providing a larger section than would result were the meeting faces of the ring sections beveled.

Figure 5:
Fig. 5 is a side elevation of a suitable spring for use in connection with my packing.

A suitable spring for use in connection with the hereinabove described type of ring is illustrated in Fig. 5. This particular spring is a flat spring turned up at one end as at 14 to engage in the split in the ring to exert rotatable pressure thereon. The spring itself is arranged in successive coils in the bottom of the groove, as appears in Fig. 1. Relative rotation of the ring sections as produced by the pressure of the spring upon one ring section in a direction counter the taper, increases the combined axial dimension of the packing within the groove. The free ring section is impelled in the same direction as the section directly acted upon by the spring by virtue of the frictional contact between the two sections.

Figure 6:
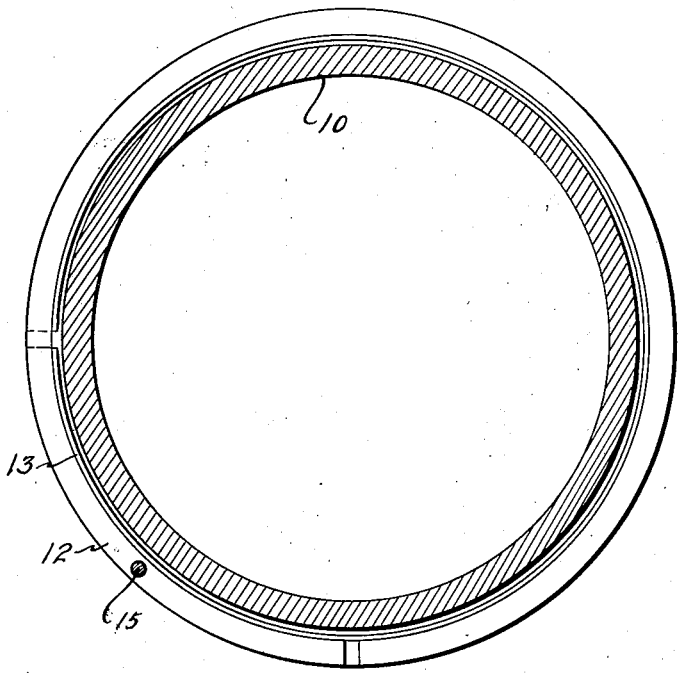
Fig. 6 is a sectional view through a piston taken on the same line as Fig. 1 showing a modified form of my packing.
Figure 7:
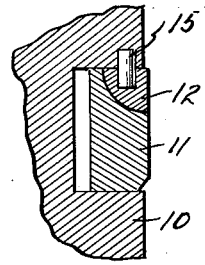
Fig. 7 is a sectional view taken on the same line as Fig. 3 showing the modified form of packing illustrated in Fig. 6.

In Figs. 6 and 7 a modification appears in which the small ring section is shown as anchored in the piston against rotation but so as to provide for axial movement within the groove, the section being anchored against rotation by means of a pin 15. The large ring section in this construction is acted upon by a spring which forces such section rotatably within the groove counter the taper of the anchored section.

Figure 8:
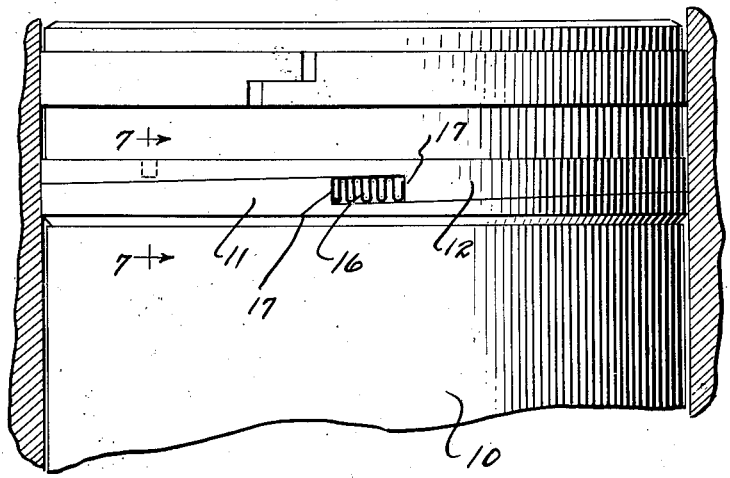
Fig. 8 is a side elevation of a portion of a piston showing another modified form of my packing positioned within the groove.

In Fig. 8 yet another form is shown in which the two ring sections are freely rotatable within the groove and a spring 16 is provided interposed between a pair of square shoulders 17 to exert rotatable pressure on the ring sections in opposite directions and counter the taper.

What I claim is:

1. In piston packing, in combination with a piston having an annular groove for packing, packing in said groove consisting of a plurality of ring sections having meeting faces oppositely longitudinally-tapered so that rotation of one ring section in a given direction relative the other section tends to increase the combined axial dimensions of the ring sections, the meeting faces of said ring sections cut on a radius so that the meeting face of one ring section is concave and the meeting face of the other ring section is convex.

2. In piston packing, in combination with a piston having an annular groove for packing, packing in said groove consisting of a plurality of ring sections having meeting faces oppositely longitudinally-tapered so that rotation of one ring section in a given direction relative the other section tends to increase the combined axial dimension of the ring sections, the meeting faces of said ring sections cut on a radius so that the meeting face of one ring section is concave and the meeting face of the other ring section is convex, and means for maintaining a pressure on one of said ring sections tending to rotate the same relative the other section and in a direction to produce expansion of the combined ring sections axially.

3. In piston packing, in combination with a piston having an annular groove for packing, packing in said groove consisting of a plurality of ring sections having meeting faces oppositely longitudinally tapered so that rotation of one ring section in a given direction relative the other section tends to increase the combined axial dimension of the ring sections, the meeting faces of said ring sections cut on a radius so that the meeting face of one ring section is concave and the meeting face of the other ring section is convex, and spring means disposed in the bottom of the groove engaging one of said ring sections to rotate the same relative the other section counter the taper thereof.

4. In combination with a piston having an annular groove for packing, a split ring section in said groove having a concave longitudinally-tapered lateral face, a second split ring section in said groove having a convex oppositely longitudinally-tapered lateral face contacting the tapered face of the first section, and means for maintaining yielding spring pressure on one of said sections tending to rotate the same relative the other section counter the taper thereof.

5. In piston packing, in combination with a piston having an annular groove for packing, packing in said groove consisting of a pair of co-operating ring sections having longitudinally-tapered, oppositely-disposed, meeting faces, the meeting face of one ring section being concave and the meeting face of the other ring section being convex on the same radius.

6. In piston packing, in combination with a piston having an annular groove for packing, packing in said groove consisting of a pair of co-operating ring sections having longitudinally-tapered, oppositely-disposed, meeting faces, the meeting face of one ring section being concave and the meeting face of the other ring section being convex on the same radius, and spring means engaging one of said ring sections to produce rotation relative the other section and counter the taper thereof.

7. In piston packing, in combination with a piston having an annular groove for packing, packing in said groove consisting of a pair of co-operating split ring sections having longitudinally-tapered oppositely-disposed arcuate meeting faces cut on the same radius, the meeting face of one ring section being concave and the meeting face of the co-operating ring section being convex, and a spring rotatably disposed within the groove coiled about the piston and engaging one of said ring sections to produce rotation thereof counter the taper of the other section.

8. In piston packing, in combination with a piston having an annular groove for packing, a split ring section in said groove having a base substantially the width of the bottom of the groove and a concave longitudinally-tapered lateral face disposed opposite the side wall of the groove, a second split ring section in said groove disposed between the tapered face of the first section and the adjacent side wall of the groove and having a convex face contacting the concave face of the first section and oppositely longitudinally tapered.

9. In piston packing, in combination with a piston having an annular groove for packing, packing in said groove consisting of a pair of co-operating split ring sections having longitudinally-tapered oppositely-disposed arcuate meeting faces cut on the same radius, the meeting face of one ring section being concave and the meeting face of the co-operating ring section being convex, and a spring arranged in successive coils about the piston in the bottom of the groove underneath one of said ring sections and turned up at the end into the split thereof to exert pressure rotatably thereon.

10. In piston packing, a piston having a groove for packing, said groove provided on one side with a stationary helical face cut on a radius, a packing ring seated in said groove between said helical face and the opposite side wall of the groove and having a corresponding helical face cut on a radius engaging the helical face of the groove.

11. In a piston packing, a piston having a groove for packing, provided with a helical face cut on a radius, a piston ring rotatably disposed within said groove having an oppositely disposed helical face cut on a radius co-acting with the helical face of the groove.

12. In piston packing, a piston having a groove for packing, provided with a helical face cut on a radius, a piston ring rotatably disposed within said groove having an oppositely disposed helical face cut on a radius co-acting with the helical face of the groove, and means exerting rotatable pressure on said ring counter the helical face of the groove.

In testimony whereof, I sign this specification.

JOHN F. PANYARD.